United States Patent [19]

Drubetsky et al.

[11] Patent Number: 5,568,053

[45] Date of Patent: Oct. 22, 1996

[54] IONIZATION GAUGE HAVING A NON-TIME VARYING MAGNETIC FIELD GENERATOR OF SEPARATED OPPOSED MAGNETS

[75] Inventors: Emil Drubetsky, Philadelphia; Donald R. Taylor, Jr., Chalfont, both of Pa.

[73] Assignee: The Fredericks Company, Huntingdon Valley, Pa.

[21] Appl. No.: 415,085

[22] Filed: Mar. 31, 1995

Related U.S. Application Data

[63] Continuation of Ser. No. 54,336, Apr. 28, 1993, abandoned.

[51] Int. Cl.$^6$ .............................. G01L 21/34; G01L 21/32
[52] U.S. Cl. ............................................. 324/463; 313/157
[58] Field of Search ........................... 324/459, 460, 324/462–464; 200/144 B, 144 R, 147 A; 340/626, 644; 313/157; 73/753; 218/120–122

[56] References Cited

U.S. PATENT DOCUMENTS

| | | | |
|---|---|---|---|
| 2,884,550 | 4/1959 | Lafferty | 313/7 |
| 3,171,081 | 2/1964 | Garwood | 73/431 |
| 3,216,652 | 11/1965 | Knauer | 417/49 |
| 3,378,712 | 4/1968 | Lafferty | 313/7 |
| 3,435,334 | 3/1969 | Helmer | 324/462 |
| 3,505,554 | 4/1970 | Vekshinsky et al. | 313/157 |
| 3,575,656 | 4/1971 | Watrous, Jr. | 324/463 |
| 3,796,917 | 3/1974 | Hiller | 324/462 |
| 3,872,377 | 3/1975 | Kageyama et al. | 324/463 |
| 4,000,457 | 12/1976 | O'Neal, III | 324/463 |
| 4,270,091 | 5/1981 | Mann | 324/462 |
| 4,672,323 | 6/1987 | Kuhl et al. | 324/463 X |
| 4,967,157 | 10/1990 | Peacock | 324/460 |

FOREIGN PATENT DOCUMENTS

| | | | |
|---|---|---|---|
| 323685 | 10/1967 | U.S.S.R. | 324/463 |
| 637749 | 12/1978 | U.S.S.R. | |
| 940263 | 7/1982 | U.S.S.R. | 324/463 |

OTHER PUBLICATIONS

McGraw–Hill Encyclopedia of Science & Technology, 6th Edition, 1987, pp. 120–122.
McGraw–Hill Dictionary of Scientific and Technical Terms, 4th Edition, 1989, p. 805.
T. V. Koroleva et al., Instruments and Experimental Techniques No. 6, Nov. 1969, pp. 1552–1554.

*Primary Examiner*—Sandra L. O'Shea
*Assistant Examiner*—Jay M. Patidar
*Attorney, Agent, or Firm*—Seidel, Gonda, Lavorgna & Monaco

[57] ABSTRACT

A cold cathode ionization gauge includes a first and second electrode spaced apart and insulated from one another and having a common axis. A magnetic field generator surrounds the gauge and applies a non-time varying magnetic field along the common axis of the electrodes. The magnetic field generator includes at least one pair of opposed axially magnetized magnets adjacent each other. In one embodiment of the invention a non-magnetic annular spacer is placed between the opposed magnets. The magnet arrangement minimizes magnetic flux outside of the gauge while increasing the strength of the magnetic flux inside of the gauge. The magnetic arrangement also allows the gauge to be ignited in a very high vacuum, thereby extending the operating range of the gauge.

40 Claims, 3 Drawing Sheets

5,568,053

IONIZATION GAUGE HAVING A NON-TIME VARYING MAGNETIC FIELD GENERATOR OF SEPARATED OPPOSED MAGNETS

This is a continuation of application Ser. No. 08/054,336 filed on Apr. 28, 1993 now abandoned.

FIELD OF THE INVENTION

This invention relates to an ionization vacuum gauge for measuring vacuum in a chamber. The invention is described in the context of, but is not limited to, an inverted magnetron type cold cathode ionization gauge.

BACKGROUND OF THE INVENTION

Cold cathode ionization gauges are known in the art. Typically, such gauges are employed for making vacuum measurements, i.e., measurements at very low pressure (e.g., $10^{-1}$ to $10^{-7}$ torr). Three commonly known cold cathode ionization gauges include normal (noninverted) magnetron type gauges, inverted magnetron type gauges, and Philips (or Penning) gauges. All of these types of gauges have a pair of electrodes in an evacuated non-magnetic envelope. The envelope has an opening which communicates with the vacuum to be measured. A high D.C. voltage is applied between the electrodes for causing a discharge current to flow therebetween. A magnetic field is applied along the axis of the electrodes in order to help maintain the discharge current at an equilibrium value which is a function of pressure. The level of vacuum of an enclosure connected to such a gauge can thus be obtained by measuring the amount of the discharge current within the gauge.

In contrast with cold cathode gauges, hot filament gauges emit electrons by heating a filament. The electrons are attracted toward a positively charged grid electrode. Collisions of electrons with gas molecules produce ions, which are then attracted to a negatively charged electrode. The current measured at this electrode is directly proportional to the pressure or gas density.

One form of prior art normal (noninverted) magnetron type and inverted magnetron type gauges include a pair of concentric cylinder-shaped electrodes, typically consisting of an anode and a cathode, spaced apart and insulated from one another. The two cylinders can thus be defined as inner and outer cylinders. A high voltage is applied between these cylindrical electrodes. The high voltage accelerates electrons traveling from the negative to the positively charged cylindrical electrode. A magnet placed around the outer cylinder provides a magnetic field which is parallel to the axis of the cylinders. This magnetic field causes the electrons to orbit in the space between the two electrodes instead of going directly to the positively charged electrode. This long orbiting path increases the probability of collision of the electrons with residual gas molecules between the inner and outer cylinders, thus improving the production of positive gas ions. The flow of these ions to the negatively charged cylinder can be detected as a current flow. This current flow is proportional to the number of molecules of gas. Since the volume of gas can be determined, the current flow can be used to calculate the gas pressure.

U.S. Pat. No. 4,270,091 discloses a Penning type vacuum pressure gauge. FIGS. 3, 5 and 7 all disclose embodiments employing a cathode, anode and two magnets. In FIG. 3, anode 21 is a stainless steel cylindrical tube. Cathode 20 is a sheet material formed into a U-shaped member. The parallel end faces of the U-shaped cathode baffle the open ends of the cylindrical anode, as depicted in FIG. 4. A magnetic field is applied along the axis of the anode between a pair of permanent magnets 49 attached to a magnetic yoke 36. The yoke completes the magnetic circuit between the two magnets. The two magnets are arranged around the cylindrical tube so that their magnetic fields add rather than oppose. In FIG. 5, two cylindrical electrodes 61 are spaced apart on a common axis to form cathodes. A cylindrical anode 62 of smaller or larger radius is coaxially disposed intermediate the cathodes. Annular permanent magnets 64 and 65 apply a magnetic field parallel to the axis. The magnets 64 and 65 are located such that their magnetic fields add, rather than oppose. In FIG. 7, a cathode such as filament 82 injects electrons by acceleration through a gridded anode 83 into a magnetic confinement region formed by two annular magnetic sources spaced apart on a common axis, as for example solenoids 84 and 85. The confined electrons execute complex trajectories principally characterized by helical motion (indicated by line e) caused by magnetic lines of force having the shape indicated generally at 87, and these electrons are reflected from regions of more intense magnetic field. The magnetic field creating elements, solenoids 84 and 85, are located so that their magnetic fields add, rather than oppose.

U.S. Pat. No. 3,435,334 discloses an ionization vacuum gauge wherein electrons emitted from floating cathode 12 and are attracted to the adjacent surface of grid cage 13, travelling radially from the cathode to the grid. This patent discloses an alternative embodiment wherein a D.C. magnetic field may be established along the electron path between the cathode and grid. An exemplary embodiment of a structure to establish such a magnetic field uses bar magnets 16 and 17 located on either side of the cathode/grid structure. The magnets reduce the interception of electrons attracted to the grid from the cathode and thereby increase the electron density within the interior of the grid cage.

U.S. Pat. No. 3,872,377 discloses a cold cathode ionization gauge for increasing the accuracy of vacuum measurements by employing a high voltage pulse generator for supplying a high voltage pulse of limited duration between a magnetic field generating means for applying a magnetic field along the axis of electrodes disposed therein. FIGS. 1, 5 and 6 of this patent depict a normal (noninverted) magnetron type gauge, inverted magnetron type gauge and Philips gauge, respectively. All of these embodiments employ a very heavy single permanent magnet along the axis of the electrodes. FIG. 7 of this patent depicts an alternative embodiment wherein the permanent magnet is replaced by an electric magnet which produces a pulsating magnetic field in synchronization with the application of the pulsating high voltage for causing a discharge within the vacuum gauge. This patent notes that one advantage of the electric magnet is that it is of light weight compared to a permanent magnet.

U.S. Pat. No. 4,000,457 discloses in FIG. 1 a cold cathode ionization gauge tube 60 comprising a central cathode 61, a coaxial anode 62 and a single magnet 63. The operating range of this gauge is extended by employing circuit elements attached to its tube, rather than by modifying aspects of the magnetic field.

U.S. Pat. No. 4,967,157 discloses a cold cathode discharge vacuum gauge which employs a conventional-type tube for pressure measurements. FIGS. 5 and 6 of this patent depicts a cold cathode ionization tube 12 of the inverted magnetron type having separate feedthroughs for anode 14 and cathode 16. The required magnet is not shown. The operating range of this gauge is also extended by employing circuit elements attached to its tube, rather than by modifying aspects of the magnetic field.

U.S. Pat. No. 3,796,917 discloses an ionizer for ionizing residual gas molecules in a vacuum spaces, and describes different techniques to enhance the magnetic field axial to the space between a cathode and anode. However, in all of the embodiments disclosed in this patent, only a single magnet is employed.

U.S. Pat. Nos. 2,884,550, 3,171,081, 3,378,712 and 3,505,554 all disclose tube-shaped ionization gauges employing a cylindrical anode, a filamentary cathode (rod) which runs centrally through the tube, and a magnet around the periphery of the tube. In all of these four patents, only a single magnet is employed.

The above-described gauges all use magnetic fields, because the magnetic field created within the ionization tubes allows for a long electron trajectory which, in turn, results in a high ionization efficiency and the ability to operate in a low vacuum. However, the need to employ strong magnets to create a useful magnetic field creates numerous disadvantages. One such disadvantage is that the magnets create strong external magnetic fields which interfere with neighboring electrical and electronic devices.

Accordingly, there is still a need for a cold cathode ionization gauge that has a magnetic field configuration which minimizes external magnetic flux. There is also a need for a gauge that can be ignited in a very high vacuum, thereby extending the operating range of such gauges. There is further a need for achieving this goal through a design that is inexpensive and simple to fabricate. The present invention fills those needs.

SUMMARY OF THE INVENTION

The present invention defines an ionization vacuum gauge apparatus comprising an evacuated envelope which defines a first electrode, a second electrode separately disposed in the envelope and having a common axis with the first electrode, a high voltage power source, a magnetic field generating means for applying a magnetic field along the common axis of the electrodes, and a current measuring means. The evacuated envelope has an opening for communicating with a region whose vacuum is to be measured. The magnetic field generating means includes at least one pair of opposed axially magnetized magnets adjacent each other. In operation, the high voltage power source applies a high voltage between the first and second electrodes and the current measuring means measures a discharge current between the electrodes.

In another embodiment, the invention defines an ionization vacuum gauge apparatus comprising an evacuated envelope having an opening for communicating with a region whose vacuum is to be measured, a first and second electrode separately disposed in the envelope and having a common axis with one another, a high voltage power source for supplying a high voltage between the electrodes, a magnetic field generating means for applying a magnetic field along the axis of the electrodes, and current measuring means for measuring a discharge current between the electrodes. The magnetic field generating means includes at least one adjacent pair of opposed axially magnetized magnets.

BRIEF DESCRIPTION OF THE DRAWINGS

For the purpose of illustrating the invention, there is shown in the drawings a form which is presently preferred; it being understood, however, that this invention is not limited to the precise arrangements and instrumentalities shown.

DESCRIPTION OF THE PREFERRED EMBODIMENT

Figure 1:
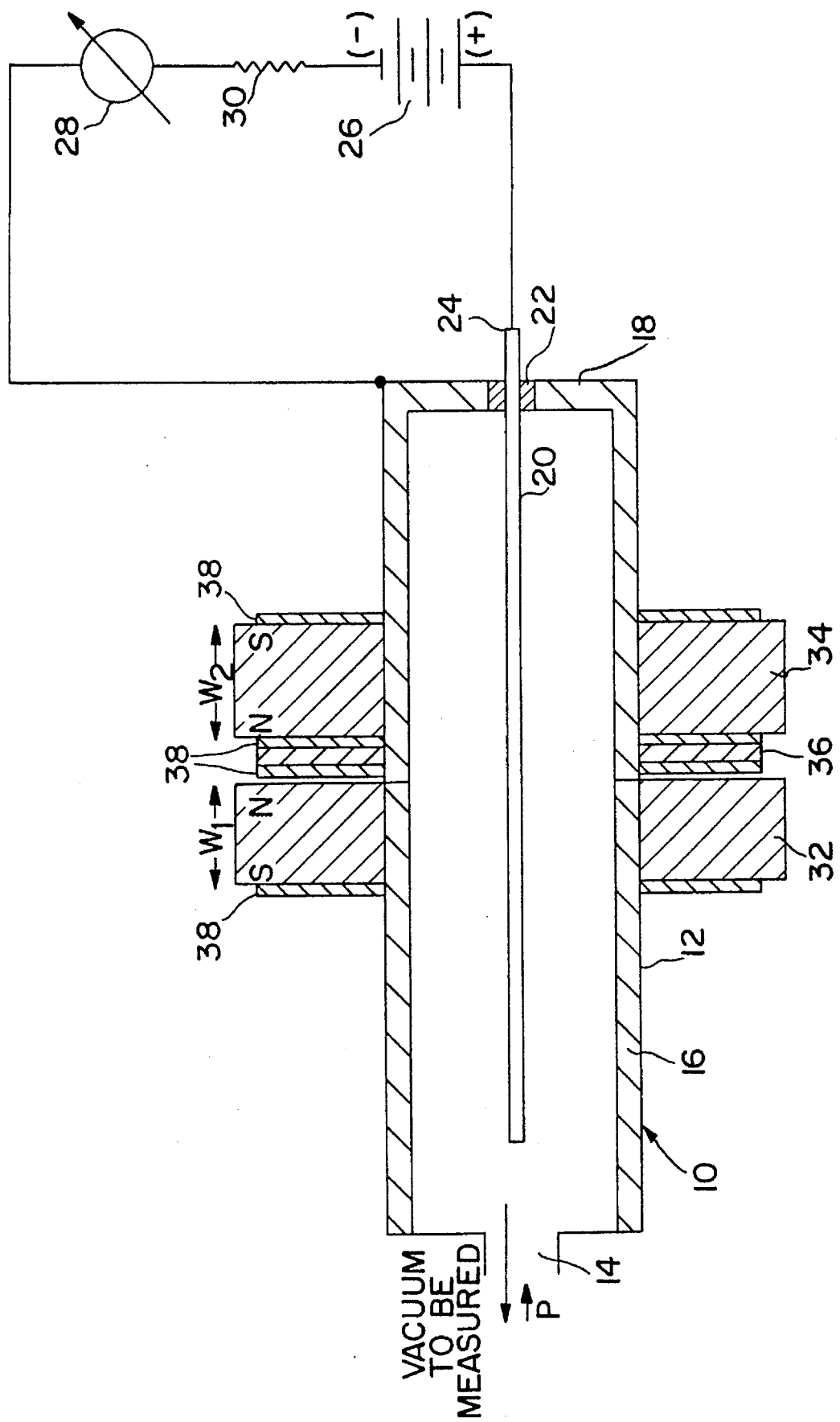
FIG. 1 shows a longitudinal cross sectional view of an exemplary ionization vacuum gauge having one set of opposed magnets and also shows a simplified schematic diagram of the attendant circuit elements of the gauge.

While the invention will be described in connection with a preferred embodiment, it will be understood that it is not intended to limit the invention to that embodiment. On the contrary, it is intended to cover all alternatives, modifications and equivalents as may be included within the spirit and scope of the invention as defined by the appended claims.

Apparatus depicting the preferred embodiments of the novel opposed magnet ionization gauge are illustrated in the drawings.

FIG. 1 shows a longitudinal cross sectional view of an exemplary ionization vacuum gauge 10 for measuring pressure in a chamber. The invention is described in the context of, but is not limited to, an inverted magnetron type cold cathode ionization gauge.

Vacuum gauge 10 comprises envelope/electrode 12 adapted for attachment to a vacuum system via inlet 14. The envelope/electrode 12 performs multiple functions. First, it provides a support structure for certain elements of the gauge. Second, it defines an open space in fluid communication with the vacuum to be measured. Third, it acts as one of the electrodes of an anode-cathode pair. The envelope/electrode 12 depicted in the preferred embodiment is cylindrical and has a longitudinally disposed surface 16 and an end wall 18 opposite the inlet 14. The radial center of the end wall 18 has a hole therethrough. Two electrodes, defined as an anode 20 and a cathode (envelope/electrode 12) define two concentric cylinders insulated from one another by an air gap. Hereinafter, the term cathode is sometimes used interchangeably with envelope/electrode 12. The anode 20 is centrally and axially located within the cylinder. One end of the anode 20 is sealingly attached through the hole in the end wall 18 of the envelope/electrode 12 so as to be supported by the end wall 18 structure. Insulation 22 separates the anode 20 and cathode 12 structure. End 24 of the anode 20 is connected to the positive side of high voltage source 26. Cathode 12 is connected through current meter 28 and resistor 30 to the negative side of the high voltage source 26.

It should be recognized that the schematic diagram shown in FIG. 1 is merely a simplified depiction of circuitry for applying a high voltage potential between the electrodes and for measuring discharge current between the pair of electrodes. Such circuitry is well-known in the art and thus, has not been described in detail.

Two axially magnetized annular shaped magnets 32 and 34 are placed around envelope/electrode 12 so as to apply a magnetic field along the axis of the cylindrical envelope/ electrode 12. That is, the magnetization flux of each of these magnets is axial and parallel to the axis of the electrodes. One important feature of the invention is that the magnets are positioned so that the north pole of magnet 32 faces the north pole of magnet 34. Alternatively, the south pole of magnet 32 could face the south pole of magnet 34. In other words, the two magnets are "opposed." A non-magnetic annular spacer 36 is placed between the magnets. Optional thin annular shims or shields 38 flank opposite sides of the magnets and are coaxial thereto. The shims or shields 38 tend to focus the magnetic field created by the magnets and stabilize the discharge. The preferred material for the shims or shields 38 is a ferromagnetic metal. It should be recognized, however, that while the shims or shields 38 enhance the performance characteristics of the gauge, they are not essential to the operation of the gauge and can be omitted without departing from the scope of the invention.

The cylindrical space within envelope/electrode 12 defined by the width of magnet 32 and associated shims 38, $W_1$, can be viewed as an "ionization cell." Thus, gauge 10 can be viewed as having two ionization cells in parallel, one defined by magnet 32, and one defined by magnet 34 ($W_2$). In the preferred embodiment, $W_1=W_2$. It should be recognized that if the optional shims 38 were not employed, $W_1$ and $W_2$ would be equal to the width of the magnets only.

In operation, a high D.C. voltage applied between electrodes 12 and 20 by high voltage source 26 causes a discharge current to flow therebetween by field emission from cathode 12. A magnetic field is applied along the axis of the electrodes by magnets 32 and 34 and helps to maintain the discharge current. The amount of vacuum of a device connected to gauge 10 can be obtained by measuring the amount of the discharge current within the gauge 10 via current meter 28.

Figure 2:
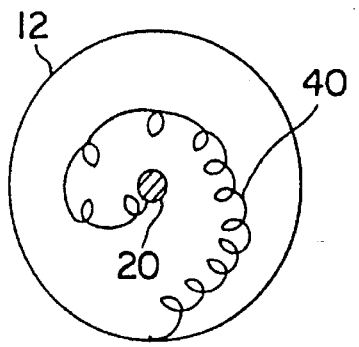
FIG. 2 shows a typical electron trajectory within the gauge of FIG. 1.

FIG. 2 shows a typical electron trajectory 40 within the gauge as it moves from anode 20 to cathode 12. The magnetic field established by magnets 32 and 34 cause the electrons to orbit in a spiral or helical manner in the space between the anode 20 and cathode 12 instead of going directly to the cathode 12. This long orbiting path increases the probability of collision of the electron with residual gas molecules between the anode 20 and cathode 12, thus improving the production of positive gas ions. The flow of these ions to the cathode 12 can be detected as a current flow. Since the current flow is proportional to the number of molecules of gas, and the volume of gas can be determined, the current flow can be used to calculate the gas pressure.

One advantage of the opposed magnet configuration is that the two opposing magnetic fields cancel out each other outside of the gauge (outside of envelope 12) but reinforce one another inside the gauge (inside envelope 12). Thus, interference with neighboring electrical and electronic devices due to strong external magnetic fields present in prior art gauges is minimized. Likewise, the reinforcement of the magnetic fields inside the gauge creates a stronger field than in prior art axial inverted magnetron type cold cathode gauges. The configuration in FIG. 1 also produces very strong local magnetic fields near the magnet faces (i.e., the annular end surfaces of the magnets) which are important to the discharge behavior, principally the low pressure ignition characteristics.

Another advantage of the opposed magnet configuration is that the gauge 10 has a higher sensitivity than a similarly configured gauge using a single magnet configuration. Without intending to be bound by any particular theory, it is believed that, since there are two ionization cells in parallel, charged particles migrating axially out of either cell have a 50 percent chance of ending up in the other cell, rather than being lost from the discharge current. It is also believed that the very intense increases in magnetic field strength measured along the cathode (longitudinal portion of envelope/electrode 12), and particularly near the plane of symmetry (i.e., a plane parallel to the magnet faces and passing through the center of spacer 36), may cause reflection of the spirally or helically orbiting electrons, thereby preventing their loss from the discharge. Although prior art cold cathode gauges also have field increases like this, the increases are not as steep as those near the plane of symmetry of an opposed magnet gauge.

As noted above, the configuration in FIG. 1 produces very strong local magnetic fields near the magnet faces which affect discharge behavior. Experimental data indicate that envelope wall thickness has a strong effect on the performance of the opposed magnet cold cathode gauge. These data indicate that, for a given magnetic induction and electric field, there is a limit to the wall thickness of the cathode (envelope/electrode 12) which should not be exceeded, or losses in stability may result. For example, when magnetic induction is in the range of 900 to 1800 Gauss and anode high voltage is in the range of 3.6 to 4.0 kV, the wall of the cathode preferably is less than 0.035 inches.

Although the envelope 12 depicted herein is of a cylindrical shape, other envelope shapes surrounded by annular magnets are also contemplated by this invention.

It should also be recognized that by merely reversing the polarity of the high voltage power source 26, the electrodes will perform an opposite function. The anode 20 would become the cathode and the cathode 12 (envelope/electrode 12) would become the anode. In other words, the anode and cathode functions can be interchanged without affecting the operability of the gauge. Such a modification may alter the performance characteristics of the gauge (e.g., ignition time and sensitivity) and may require alternative dimensions and materials to obtain satisfactory operation, but such modifications are well within the level of skill in the art.

Furthermore, magnets 32 and 34 can be opposed electromagnets. As is well-recognized in the prior art, electric magnets or electromagnets provide significant weight savings compared with permanent magnets.

Figure 3:
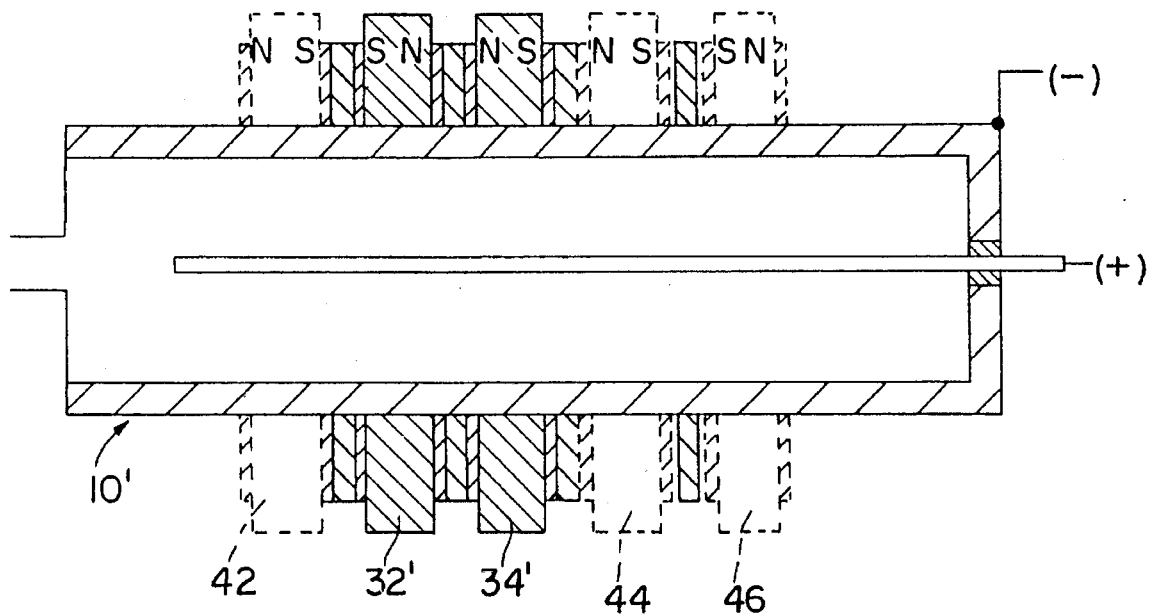
FIG. 3 shows a longitudinal cross sectional view of an alternative embodiment of the vacuum gauge of FIG. 1 employing additional configurations of magnets.

FIG. 3 shows an alternative embodiment of a vacuum gauge 10', absent the schematic circuitry, wherein an additional magnet 42 and an additional set of magnets 44 and 46 are employed, some of which are opposed to one another (e.g., N—N or S—S) and some of which are alternately poled (e.g., N-S or S-N). The additional magnets are shown in phantom by dotted lines. Various configurations of magnets shown in phantom can be arranged to achieve desired results. All of the configurations, however, include at least one set of opposed magnets 32' and 34'.

Figure 4:
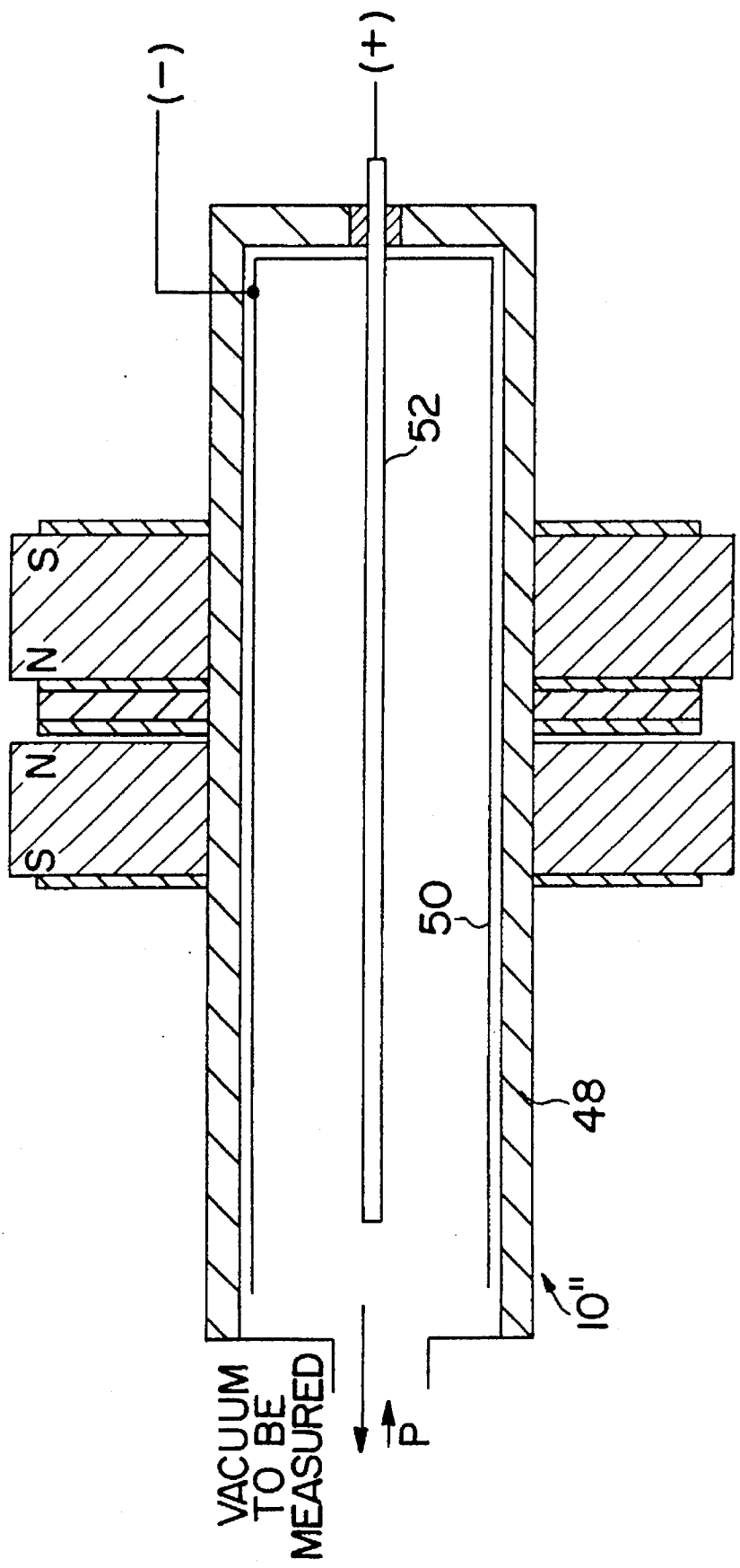
FIG. 4 shows a longitudinal cross sectional view of another embodiment of the vacuum gauge of FIG. 1 wherein a separate envelope surrounds the electrode elements.

FIG. 4 shows an embodiment of a gauge 10", absent the schematic circuitry, wherein a separate non-magnetic enclosure 48 (evacuated envelope) is in fluid contact with the vacuum. In this embodiment, both electrodes, cathode 50 and anode 52, are disposed within the enclosure 48. The cathode 50 and anode 52 still define two concentric cylinders insulated from one another by an air gap, in the same manner as shown in FIG. 1. This type of envelope configuration is also shown in U.S. Pat. No. 4,967,157, described above. However, this prior art configuration does not employ opposed magnets as described herein. The opposed magnet structure described herein can be equally employed in such configurations wherein the magnets surround the non-magnetic enclosure. One potential advantage of the embodiment in FIG. 4 is that it may allow the ion current to be separated from the leakage current, thereby improving the overall accuracy of the gauge.

The novel ionization gauge described above provides significant advantages over prior art ionization gauges. The configuration of the magnetic field lines produced by the opposed magnets minimizes external magnetic flux lines that can cause interference with neighboring elements. The opposed magnet structure allows for the electrical discharge set up within the gauge to persist to much lower pressure before extinguishing, thereby extending the operating range of the gauge. Furthermore, the time to ignite at lower pressures is considerably shortened.

The present invention may be embodied in other specific forms without departing from the spirit or essential attributes thereof and, accordingly, reference should be made to the appended claims, rather than to the foregoing specification, as indicating the scope of the invention.

We claim:

1. An ionization vacuum gauge apparatus comprising:
   (a) an evacuated envelope defining a first electrode, the envelope having an opening for communicating with a region whose vacuum is to be measured;
   (b) a second electrode separately disposed in the envelope and having a common axis with the first electrode;
   (c) a high voltage power source for applying a high voltage between the first and second electrodes;
   (d) a magnetic field generating means for applying a non-time varying magnetic field along the common axis of the electrodes, the magnetic field generating means including at least one pair of opposed axially magnetized magnets adjacent to each other and separated by a small non-magnetic gap; and
   (e) current measuring means for measuring a discharge current between the electrodes, the discharge current being a function of the amount of vacuum in the region.

2. The apparatus according to claim 1, wherein each of the opposed magnets has a preselected axial width, the space within the envelope encompassed by the width defining an ionization cell.

3. The apparatus according to claim 2, wherein the ionization cells are coaxial to one another.

4. The apparatus according to claim 1, wherein the electrodes comprise an anode and a cathode, the cathode being defined by the envelope.

5. The apparatus according to claim 4, wherein the anode is a rod axially disposed in the envelope.

6. The apparatus according to claim 1, wherein the opposed magnets are separated by a non-magnetic spacer.

7. The apparatus according to claim 1, wherein the magnets are annular.

8. The apparatus according to claim 1, wherein the opposed magnets surround at least a portion of the envelope.

9. The apparatus according to claim 1, wherein the envelope is tubular and the opposed magnets are annular and surround the tubular envelope.

10. The apparatus according to claim 1, wherein the magnets are permanent magnets.

11. The apparatus according to claim 1, further comprising at least one additional axially magnetized magnet for applying a magnetic field along the axis of the electrodes, the additional magnet being adjacent to one of the pair of opposed magnets, the additional magnet being magnetically opposed to the adjacent one of the pair of opposed magnets.

12. The apparatus according to claim 1, further comprising at least one additional axially magnetized magnet for applying a magnetic field along the axis of the pair of electrodes, the additional magnet being adjacent to one of the pair of opposed magnets, the additional magnet being alternately poled with respect to the adjacent one of the pair of opposed magnets.

13. The apparatus according to claim 1, wherein the electrodes consist of two concentric cylinders spaced apart and insulated from one another.

14. The apparatus according to claim 1, wherein the vacuum gauge apparatus is of the inverted magnetron type.

15. In a cold-cathode ionization gauge system for measuring the pressure in a chamber, the system including a vacuum enclosure defining a first electrode, the enclosure having an opening for communicating with the chamber whose pressure is to be measured, a second electrode spaced apart and insulated from the first electrode in the enclosure and having a common axis with the first electrode, a high voltage power source for supplying a high voltage between the electrodes, and means for measuring current collected at the first electrode caused by ions impinging thereupon, the current being a function of the pressure in the chamber, the system additionally including:

a magnetic field generating means for applying a non-time varying magnetic field along the common axis of the electrodes, the magnetic field generating means including at least one pair of opposed axially magnetized magnets adjacent each other and separated by a small non-magnetic gap.

16. The apparatus according to claim 15, wherein each of the opposed magnets has a preselected axial width, the space within the enclosure encompassed by the width defining an ionization cell.

17. The apparatus according to claim 16, wherein the ionization cells are coaxial to one another.

18. The apparatus according to claim 15, wherein the electrodes comprise an anode and a cathode, the cathode being defined by the enclosure.

19. The apparatus according to claim 18, wherein the anode is a rod axially disposed in the enclosure.

20. The apparatus according to claim 15, wherein the opposed magnets are separated by a non-magnetic spacer.

21. The apparatus according to claim 15, wherein the magnets are annular.

22. The apparatus according to claim 15, wherein the opposed magnets surround at least a portion of the enclosure.

23. The apparatus according to claim 15, wherein the enclosure is tubular and the opposed magnets are annular and surround the tubular enclosure.

24. The apparatus according to claim 15, wherein the magnets are permanent magnets.

25. The apparatus according to claim 15, further comprising at least one additional axially magnetized magnet for applying a magnetic field along the axis of the electrodes, the additional magnet being adjacent to one of the pair of opposed magnets, the additional magnet being magnetically opposed to the adjacent one of the pair of opposed magnets.

26. The apparatus according to claim 15, further comprising at least one additional axially magnetized magnet for applying a magnetic field along the axis of the pair of electrodes, the additional magnet being adjacent to one of the pair of opposed magnets, the additional magnet being alternately poled with respect to the adjacent one of the pair of opposed magnets.

27. The apparatus according to claim 15, wherein the electrodes consist of two concentric cylinders spaced apart and insulated from one another.

28. The apparatus according to claim 15, wherein the vacuum gauge apparatus is of the inverted magnetron type.

29. An ionization vacuum gauge apparatus comprising:
 (a) an evacuated envelope, the envelope having an opening for communicating with a region whose vacuum is to be measured;
 (b) a first and second electrode separately disposed in the envelope and having a common axis with one another;
 (c) a high voltage power source for supplying a high voltage between the electrodes;
 (d) a magnetic field generating means for applying a non-time varying magnetic field along the axis of the electrodes, the magnetic field generating means including at least one adjacent pair of opposed axially magnetized magnets separated by a small non-magnetic gap; and
 (e) current measuring means for measuring a discharge current between the electrodes, the discharge current being a function of the amount of vacuum in the region.

30. The apparatus according to claim 29, wherein each of the opposed magnets has a preselected axial width, the space within the envelope encompassed by the width defining an ionization cell.

31. The apparatus according to claim 30, wherein the ionization cells are coaxial to one another.

32. The apparatus according to claim 29, wherein the electrodes comprise an anode and a cathode.

33. The apparatus according to claim 32, wherein the anode is a rod axially disposed in the envelope.

34. The apparatus according to claim 29, wherein the opposed magnets are separated by a non-magnetic spacer.

35. The apparatus according to claim 29, wherein the magnets are annular.

36. The apparatus according to claim 29, wherein the opposed magnets surround at least a portion of the envelope.

37. The apparatus according to claim 29, wherein the envelope is tubular and the opposed magnets are annular and surround the tubular envelope.

38. The apparatus according to claim 29, wherein the magnets are permanent magnets.

39. The apparatus according to claim 29, wherein the electrodes consist of two concentric cylinders spaced apart and insulated from one another.

40. The apparatus according to claim 29, wherein the vacuum gauge apparatus is of the inverted magnetron type.

* * * * *